United States Patent
Kokushi et al.

(10) Patent No.: US 12,440,296 B2
(45) Date of Patent: Oct. 14, 2025

(54) ROBOT SYSTEM

(71) Applicant: KAWASAKI JUKOGYO KABUSHIKI KAISHA, Kobe (JP)

(72) Inventors: Hiroki Kokushi, Kobe (JP); Hideyuki Ryu, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 155 days.

(21) Appl. No.: 18/556,788

(22) PCT Filed: Apr. 25, 2022

(86) PCT No.: PCT/JP2022/018779
§ 371 (c)(1),
(2) Date: Oct. 23, 2023

(87) PCT Pub. No.: WO2022/230826
PCT Pub. Date: Nov. 3, 2022

(65) Prior Publication Data
US 2024/0238058 A1    Jul. 18, 2024

(30) Foreign Application Priority Data
Apr. 26, 2021 (JP) .................... 2021-074379

(51) Int. Cl.
*A61B 34/30* (2016.01)
*A61B 34/37* (2016.01)
*B25J 3/00* (2006.01)

(52) U.S. Cl.
CPC ................. *A61B 34/37* (2016.02); *B25J 3/00* (2013.01)

(58) Field of Classification Search
CPC ....... A61B 34/37; A61B 34/30; A61B 19/201; A61B 19/203; A61B 19/22; A61B 19/5244; A61B 17/3403
See application file for complete search history.

(56) References Cited

U.S. PATENT DOCUMENTS

| | | | |
|---|---|---|---|
| 7,413,565 B2 * | 8/2008 | Wang | A61B 34/75 606/1 |
| 2008/0234866 A1 | 9/2008 | Kishi et al. | |
| 2011/0264113 A1 | 10/2011 | Choi et al. | |
| 2017/0360519 A1 | 12/2017 | Yorimoto et al. | |
| 2018/0250086 A1 * | 9/2018 | Grubbs | A61B 34/35 |
| 2018/0353247 A1 | 12/2018 | Ishihara et al. | |

FOREIGN PATENT DOCUMENTS

| | | |
|---|---|---|
| JP | 2008-228967 A | 10/2008 |
| JP | 2013-088852 A | 5/2013 |
| JP | 2018-202027 A | 12/2018 |
| WO | 2016/194539 A1 | 12/2016 |

* cited by examiner

*Primary Examiner* — Vi X Nguyen
(74) *Attorney, Agent, or Firm* — METROLEX IP LAW GROUP, PLLC; Robert L. Scott, Esq.

(57) ABSTRACT

A robot system (100) includes a slave robot (10), a master robot (20) to remotely control the slave robot, and an elbow guide mechanism (40) including an elbow support (41) operable to move to guide an elbow of an operator (O) while supporting the elbow of the operator when the master robot is operated by the operator.

11 Claims, 6 Drawing Sheets

ROBOT SYSTEM

TECHNICAL FIELD

The present disclosure relates to a robot system, and more particularly, it relates to a robot system including a slave robot and a master robot.

BACKGROUND ART

Conventionally, a robot system including a slave robot and a master robot is known. Such a robot system is disclosed in Japanese Patent Laid-Open No. 2008-228967, for example.

Japanese Patent Laid-Open No. 2008-228967 discloses a master-slave manipulator system including a slave manipulator (slave robot) and a master device (master robot). In this master-slave manipulator system, an operator remotely controls the slave manipulator using the master device to perform surgery on a patient placed on a surgical table. The operator sits on a chair and operates the master device while putting their elbows on an armrest.

PRIOR ART

Patent Document

Patent Document 1: Japanese Patent Laid-Open No. 2008-228967

SUMMARY OF THE INVENTION

However, in the master-slave manipulator system described in Japanese Patent Laid-Open No. 2008-228967, the operator operates the master device while putting their elbows on the armrest, and thus the operator rotates their forearms with their elbows put on the armrest as the centers of rotation (fulcrums) to linearly operate the slave manipulator when linearly operating the slave manipulator using the master device. In this case, it is difficult for the operator to accurately linearly operate the slave manipulator due to rotation of their arms about their elbows put on the armrest.

The present disclosure is intended to solve the above problem. The present disclosure aims to provide a robot system that enables an accurate linear operation for a slave robot to be performed even when an operator performs work by operating the slave robot while the elbow of the operator is supported by an elbow support.

In order to attain the aforementioned object, a robot system according to an aspect of the present disclosure includes a slave robot, a master robot to remotely control the slave robot, and an elbow guide mechanism including an elbow support operable to move to guide an elbow of an operator while supporting the elbow of the operator when the master robot is operated by the operator.

As described above, the robot system according to this aspect of the present disclosure includes the elbow guide mechanism including the elbow support operable to move to guide the elbow of the operator while supporting the elbow of the operator when the master robot is operated by the operator. Accordingly, when the master robot is operated by the operator, the elbow of the operator can be linearly moved by moving the elbow support of the elbow guide mechanism. Consequently, when the operator uses the master robot to linearly operate the slave robot, the operator can linearly operate the slave robot by linearly moving the elbow and the entire forearm of the operator, and thus it is not necessary to rotate the forearm with the elbow as the center of rotation (fulcrum) in order to linearly operate the slave robot. Thus, hindrance of an accurate linear operation for the slave robot by rotation of the arm of the operator about the elbow can be reduced or prevented. Consequently, even when the slave robot is operated to perform work while the elbow of the operator is supported by the elbow support, an accurate linear operation for the slave robot can be performed.

According to the present disclosure, as described above, even when the slave robot is operated to perform work while the elbow of the operator is supported by the elbow support, an accurate linear operation for the slave robot can be performed.

MODES FOR CARRYING OUT THE INVENTION

First Embodiment

Figure 1:
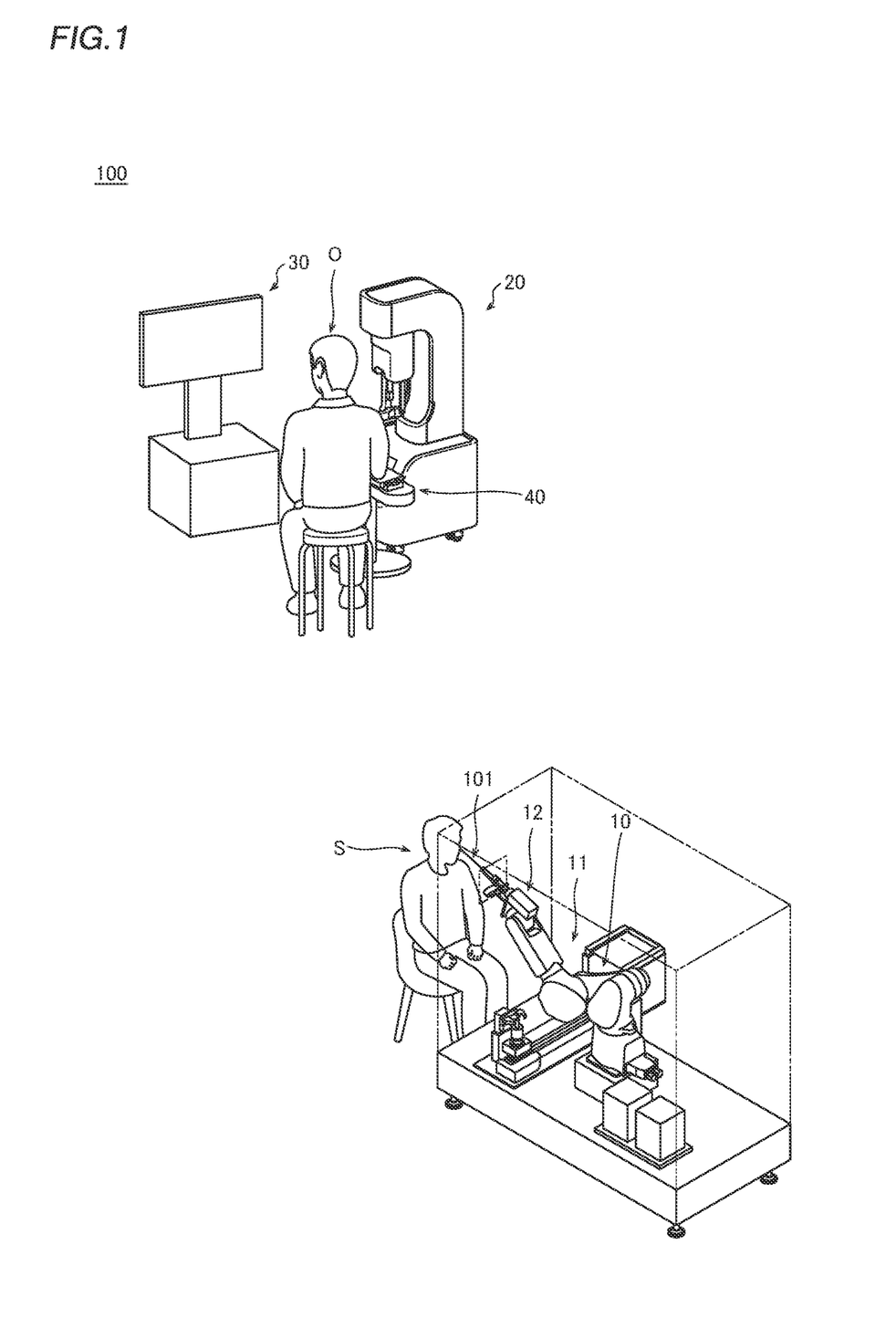
FIG. 1 is a diagram showing a robot system according to a first embodiment.

As shown in FIG. 1, a robot system 100 according to a first embodiment includes a slave robot 10, a master robot 20, a display 30, and an elbow guide mechanism 40.

Figure 2:
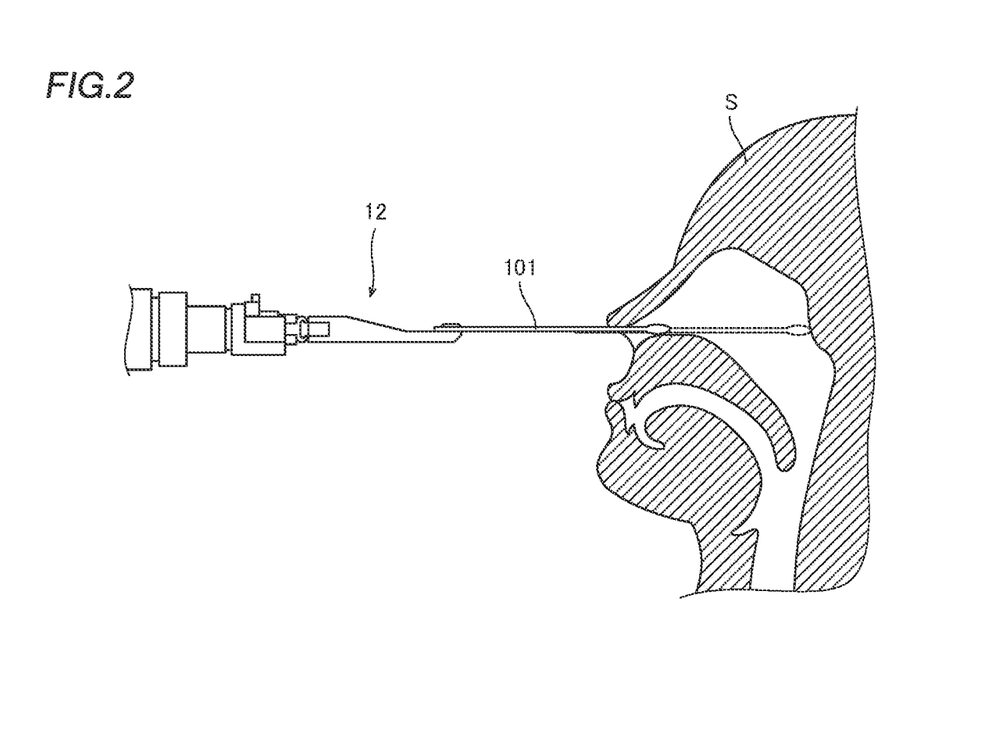
FIG. 2 is a diagram showing specimen collection by operating a slave robot according to the first embodiment.

As shown in FIGS. 1 and 2, the slave robot 10 performs a procedure to collect a specimen from a subject S using a specimen collection member 101. The specimen collection member 101 is a sterile swab, for example. The sterile swab has a stick shape. The slave robot 10 inserts the specimen collection member 101 into the nasal cavity of the subject S, for example, and collects the specimen (nasopharyngeal swab) from the nasopharynx of the subject S by the inserted specimen collection member 101. The slave robot 10 may insert the specimen collection member 101 into the oral cavity of the subject S to collect the specimen. A virus test such as a PCR (polymerase chain reaction) test is performed on the collected specimen. In the robot system 100, a person in charge of specimen collection, such as a doctor, does not need to face the subject S to collect the specimen, and thus it is possible to isolate the person in charge of specimen collection from the risk of infection. The specimen collection member 101 is an example of a treatment member. The subject S is an example of a person to be treated.

As shown in FIG. 1, the slave robot 10 is a vertical articulated robot. The slave robot 10 includes an arm 11 and a hand 12 attached to a tip end of the arm 11. The arm 11 has a plurality of joints. Each of the plurality of joints of the arm 11 includes a drive such as a servomotor and a position detector such as an encoder. The hand 12 holds the specimen collection member 101. The hand 12 includes a pair of gripping members, for example, and grips and holds the specimen collection member 101 with the pair of gripping members.

The master robot 20 remotely controls the slave robot 10. Specifically, the master robot 20 remotely controls the slave robot 10 by being operated by an operator O such as a doctor. The master robot 20 outputs an operation command based on an operation of the operator O. The slave robot 10 performs an action corresponding to the operation of the operator O based on the operation command from the master robot 20. The slave robot 10 and the master robot 20 are communicably connected to each other by wire or wirelessly.

Figure 3:
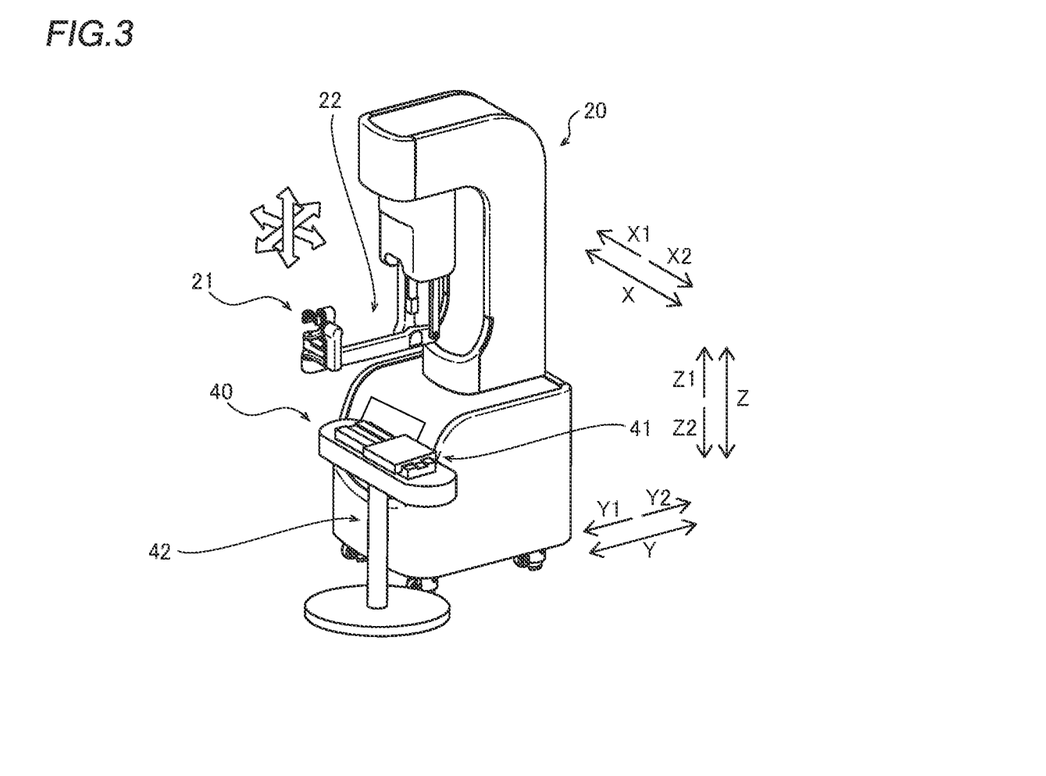
FIG. 3 is a perspective view showing a master robot and an elbow guide mechanism according to the first embodiment.

As shown in FIGS. 1 and 3, the master robot 20 includes an operation unit 21 and an arm 22 that supports the operation unit 21 such that the operation unit 21 is movable. The operation unit 21 is provided to remotely control the hand 12 of the slave robot 10 that holds the specimen collection member 101. Specifically, the operation unit 21 is a grip handle having a bar shape. The operation unit 21 receives an operation for the slave robot 10 from the operator O moving the operation unit 21 while holding the operation unit 21 with one hand. The operation unit 21 is operated by the right hand of the operator O, for example. The arm 22 has a plurality of joints and supports the operation unit 21 such that the operation unit 21 is movable in an upward-downward direction (Z direction), a right-left direction (Y direction), and a forward-rearward direction (X direction).

The slave robot 10 is moved in a direction corresponding to a direction in which the operator O has moved the operation unit 21. When the operator O has moved the operation unit 21 in the upward-downward direction (Z direction), for example, the hand 12 of the slave robot 10 (and the specimen collection member 101 held by the hand 12) is moved in the upward-downward direction. When the operator O has moved the operation unit 21 in the right-left direction (Y direction), for example, the hand 12 of the slave robot 10 (and the specimen collection member 101 held by the hand 12) is moved in the right-left direction. When the operator O has moved the operation unit 21 in the forward-rearward direction (X direction), for example, the hand 12 of the slave robot 10 (and the specimen collection member 101 held by the hand 12) is moved in the forward-rearward direction. When the specimen is collected from the subject S by the specimen collection member 101, the operator O moves the operation unit 21 in a forward direction (X1 direction) to move the hand 12 of the slave robot 10 (and the specimen collection member 101 held by the hand 12) in the forward direction (insertion direction) such that the specimen collection member 101 is inserted into the nasal cavity of the subject S.

As shown in FIG. 1, the display 30 displays an image (video) of the subject S. The display 30 displays a video captured by a camera (not shown) provided at a tip end of the arm 11 of the slave robot 10 to image the subject S from the front, and a video captured by a camera (not shown) that images the subject S from the side, for example. While checking the real-time video of the subject S displayed on the display 30, the operator O operates the slave robot 10 using the master robot 20 to collect the specimen from the subject S by the specimen collection member 101. The display 30 includes a liquid crystal monitor, for example.

Figure 4:
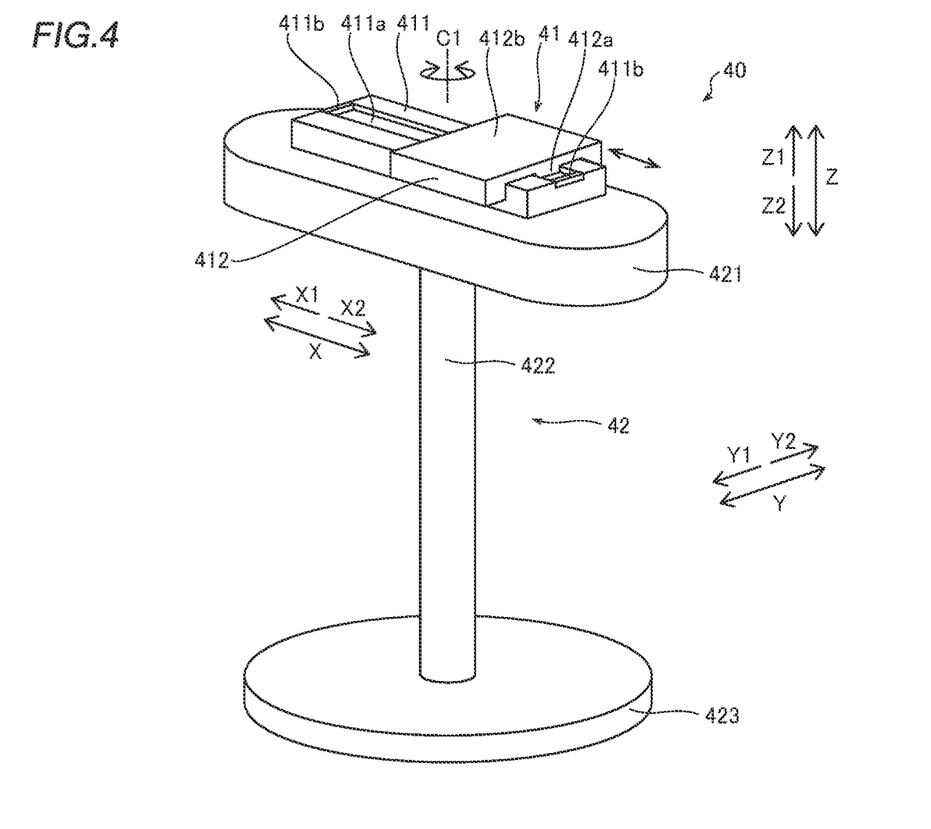
FIG. 4 is a perspective view showing the elbow guide mechanism according to the first embodiment.
Figure 5:
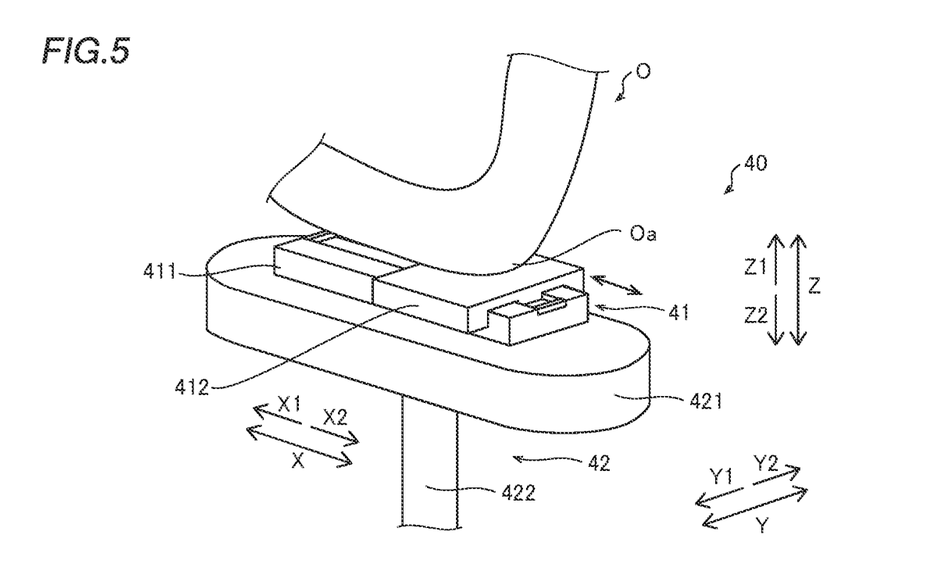
FIG. 5 is a perspective view showing the elbow guide mechanism with the elbow of an operator placed thereon according to the first embodiment.

As shown in FIGS. 3 to 5, the elbow guide mechanism 40 supports the elbow Oa (see FIG. 5) of the operator O when the master robot 20 is operated by the operator O. The elbow guide mechanism 40 is arranged in the vicinity of the master robot 20. The elbow guide mechanism 40 is provided separately from and independently of the master robot 20. The elbow guide mechanism 40 does not include a drive such as a motor.

In the first embodiment, the elbow guide mechanism 40 includes an elbow support 41 and a stand 42 that supports the elbow support 41. The elbow support 41 moves to guide the elbow Oa (the elbow on the side on which the operation unit 21 is held) of the operator O while supporting the elbow Oa of the operator O when the master robot 20 is operated by the operator O. Specifically, the elbow support 41 linearly moves while supporting the elbow Oa of the operator O. More specifically, in the first embodiment, the elbow support 41 linearly moves in a direction (X direction) corresponding to the insertion direction of the specimen collection member 101 into the subject S while supporting the elbow Oa of the operator O. In the first embodiment, the elbow support 41 linearly moves in the forward-rearward direction (X direction) with respect to the body of the operator O while supporting the elbow Oa of the operator O. Furthermore, the elbow support 41 linearly moves in a single horizontal direction (X direction) while supporting the elbow Oa of the operator O. The term "linearly moving" indicates a broader concept including not only moving in a perfectly straight line but also moving in a straight line with some deviation (in a curved line).

In the first embodiment, the elbow support 41 is slidable and of a linearly moving type. Specifically, the elbow support 41 includes a rail 411 and a slider 412 that slides on the rail 411. The rail 411 extends along a predetermined direction (X direction). The rail 411 engages with the slider 412 such that the slider 412 is slidable in the predetermined direction. Specifically, the rail 411 includes an engaging portion 411a that engages with an engaging portion 412a of the slider 412 described below. The engaging portion 411a is a concave portion that is recessed downward (Z2 direction side) from above (Z1 direction side). The engaging portion 411a extends along the predetermined direction from one end to the other end of the rail 411 in the predetermined direction.

Stoppers 411b are provided at ends of the rail 411 in the predetermined direction (X direction) to restrict the sliding range of the slider 412. One stopper 411b is provided at each of one end and the other end of the rail 411 in the predetermined direction. The sliding range of the slider 412 is restricted by the stoppers 411b, and thus the slider 412 does not drop off from the rail 411 even when the slider 412 is slid to one end or the other end of the rail 411.

The slider 412 slides on the rail 411 along the predetermined direction (X direction). The slider 412 engages with the rail 411 so as to slide on the rail 411 along the predetermined direction. Specifically, the slider 412 includes the engaging portion 412a that engages with the engaging portion 411a of the rail 411. The engaging portion 412a is a convex portion that protrudes downward (Z2 direction side) from above (Z1 direction side). The slider 412 slides along the engaging portion 411a while the engaging portion 412a engages with the engaging portion 411a of the rail 411. Furthermore, the slider 412 slides within the sliding range restricted by the stoppers 411b. The sliding range restricted by the stoppers 411b is larger than the operation amount (movement amount) of the operation unit 21 corresponding to the insertion amount of the specimen collection member 101 into the subject S when the specimen is collected from the subject S by the specimen collection member 101.

The slider 412 supports the elbow Oa of the operator O. Specifically, the slider 412 includes a support surface 412b that supports the elbow Oa of the operator O. The support surface 412b is a flat surface substantially parallel to the horizontal direction. The elbow Oa of the operator O is placed on the support surface 412b. When the operator O moves the operation unit 21 in the X direction with the elbow Oa of the operator O placed on the support surface 412b, a frictional force between the elbow Oa of the operator O and the support surface 412b causes the slider 412 to slide on the rail 411 so as to follow the elbow Oa of the operator O. The elbow guide mechanism 40 may include a fixing member such as a belt to fix the elbow Oa of the operator O to the slider 412.

The stand 42 supports the elbow support 41. Specifically, the stand 42 includes a board 421, a column 422 that supports the board 421, and a base 423 that supports the column 422. The board 421 supports the elbow support 41. The board 421 extends along the predetermined direction (X direction) in which the rail 411 of the elbow support 41 extends. The column 422 extends along the upward-downward direction (Z direction). The column 422 has a columnar shape. An upper end of the column 422 is connected to the board 421, and a lower end of the column 422 is connected to the base 423.

The column 422 supports the board 421 such that the board 421 is rotatable about a rotation axis C1 extending along the upward-downward direction (Z direction). Thus, the board 421 is rotatable about the rotation axis C1 with respect to the column 422. Moreover, the elbow support 41 is rotated about the rotation axis C1 by rotating the board 421 about the rotation axis C1. Thus, in the first embodiment, the orientation of the elbow support 41 is adjustable on the stand 42. That is, the elbow support 41 is rotated about the rotation axis C1 such that the orientation of the elbow support 41 is adjustable with respect to the operation unit 21 of the master robot 20 on the stand 42. The elbow support 41 and the board 421 are rotated in a horizontal plane. The base 423 is installed on an installation surface (floor surface). The base 423 has a flat circular shape.

Advantages of First Embodiment

According to the first embodiment, the following advantages are achieved.

According to the first embodiment, as described above, the robot system 100 includes the elbow guide mechanism 40 including the elbow support 41 operable to move to guide the elbow Oa of the operator O while supporting the elbow Oa of the operator O when the master robot 20 is operated by the operator O. Accordingly, when the master robot 20 is operated by the operator O, the elbow Oa of the operator O can be linearly moved by moving the elbow support 41 of the elbow guide mechanism 40. Consequently, when the operator O uses the master robot 20 to linearly operate the slave robot 10, the operator O can linearly operate the slave robot 10 by linearly moving the elbow Oa and the entire forearm of the operator O, and thus it is not necessary to rotate the forearm with the elbow Oa as the center of rotation (fulcrum) in order to linearly operate the slave robot 10. Thus, hindrance of an accurate linear operation for the slave robot 10 by rotation of the arm of the operator O about the elbow Oa can be reduced or prevented. Consequently, even when the slave robot 10 is operated to perform work (specimen collection) while the elbow Oa of the operator O is supported by the elbow support 41, an accurate linear operation for the slave robot 10 can be performed.

According to the first embodiment, as described above, the elbow support 41 is operable to linearly move while supporting the elbow Oa of the operator O. Accordingly, when the master robot 20 is operated by the operator O, the elbow support 41 of the elbow guide mechanism 40 is linearly moved such that the elbow Oa of the operator O can be easily moved linearly. Consequently, an accurate linear operation for the slave robot 10 can be easily performed.

According to the first embodiment, as described above, the elbow support 41 is operable to linearly move in at least the direction corresponding to the insertion direction of the specimen collection member 101 into the subject S while supporting the elbow Oa of the operator O. Accordingly, when the slave robot 10 is operated to insert the specimen collection member 101 into the subject S, hindrance of an accurate linear operation for the slave robot 10 by rotation of the arm of the operator O about the elbow Oa can be reduced or prevented. Consequently, the slave robot 10 can be accurately operated to insert the specimen collection member 101 into the subject S.

According to the first embodiment, as described above, the elbow support 41 is operable to linearly move in at least the forward-rearward direction with respect to the body of the operator O while supporting the elbow Oa of the operator O. Accordingly, when the slave robot 10 is operated (to insert the specimen collection member 101 into the subject S, for example) by linearly moving the elbow in the forward-rearward direction with respect to the body of the operator O, hindrance of an accurate linear operation for the slave robot 10 by rotation of the arm of the operator O about the elbow Oa can be reduced or prevented. Consequently, an operation for the slave robot 10 by linearly moving the elbow of the operator O in the forward-rearward direction with respect to the body of the operator O can be accurately performed.

According to the first embodiment, as described above, the elbow guide mechanism 40 includes the slidable and linearly moving type elbow support 41. Accordingly, the elbow Oa and the entire forearm of the operator O can be easily moved linearly by the slidable and linearly moving type elbow support 41. Consequently, a linear operation for the slave robot 10 can be easily and accurately performed.

According to the first embodiment, as described above, the linearly moving type elbow support 41 includes the rail 411 extending along the predetermined direction, and the slider 412 operable to slide on the rail 411 along the predetermined direction and support the elbow Oa of the operator O. Accordingly, with a simple configuration in which the slider 412 is slid on the rail 411, the elbow Oa and the entire forearm of the operator O can be linearly moved. Consequently, with a simple configuration, a linear operation for the slave robot 10 can be accurately performed.

According to the first embodiment, as described above, the slider 412 is operable to slide within the sliding range restricted by the stoppers 411b. Accordingly, the slider 412 can be slid within an appropriate range without dropping off from the rail 411.

According to the first embodiment, as described above, the elbow guide mechanism 40 includes the stand 42 to support the linearly moving type elbow support 41. Furthermore, the orientation of the elbow support 41 is adjustable on the stand 42. Accordingly, the sliding direction (predetermined direction) of the elbow support 41 can be adjusted to a desired direction by adjusting the orientation of the elbow support 41 on the stand 42. Consequently, the convenience of the elbow support 41 can be improved as compared with a case in which the orientation of the elbow support 41 cannot be adjusted on the stand 42.

Second Embodiment

The configuration of a robot system 200 according to a second embodiment is now described with reference to FIGS. 6 to 8. The robot system 200 includes an elbow guide mechanism 240, unlike the first embodiment in which the elbow guide mechanism 40 is provided. The same or similar configurations as those of the first embodiment are denoted by the same reference numerals, and detailed description thereof is omitted.

Figure 6:
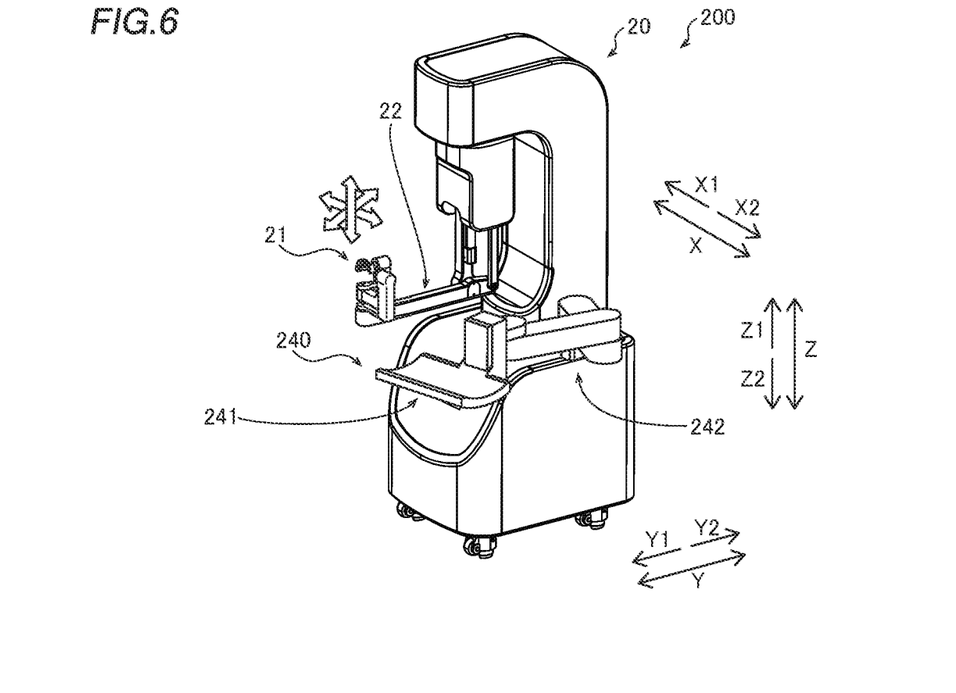
FIG. 6 is a perspective view showing a master robot and an elbow guide mechanism according to a second embodiment.
Figure 7:
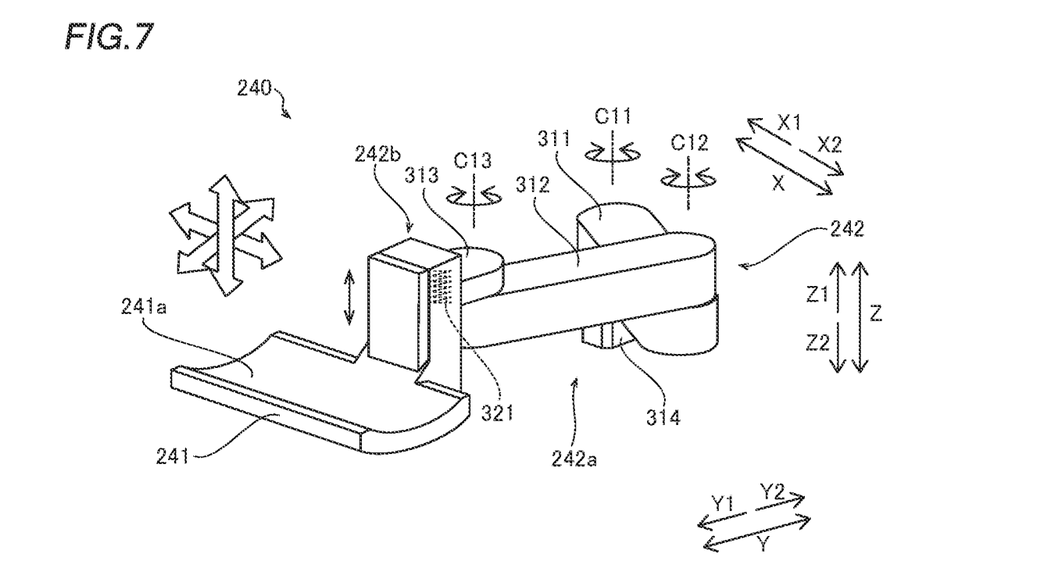
FIG. 7 is a perspective view showing the elbow guide mechanism according to the second embodiment.
Figure 8:
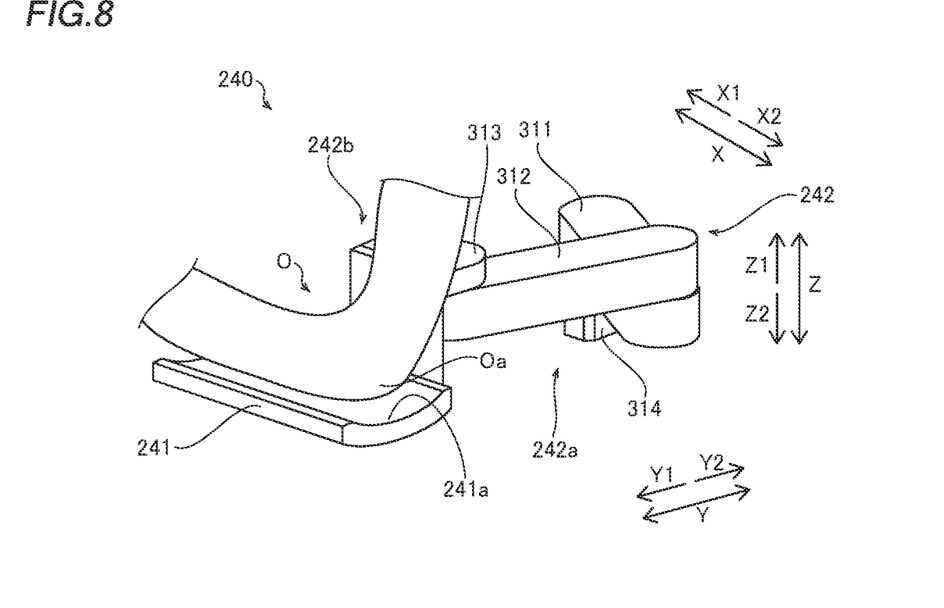
FIG. 8 is a perspective view showing the elbow guide mechanism with the elbow of an operator placed thereon according to the second embodiment.

As shown in FIGS. 6 to 8, the robot system 200 according to the second embodiment includes the elbow guide mechanism 240 instead of the elbow guide mechanism 40 according to the first embodiment. The elbow guide mechanism 240 does not include a drive such as a motor.

In the second embodiment, the elbow guide mechanism 240 is attached to a master robot 20. The elbow guide mechanism 240 is an arm-type elbow guide mechanism movable by a plurality of (three) joints. Specifically, the elbow guide mechanism 240 includes an elbow support 241 and an arm 242 that supports the elbow support 241. The elbow support 241 supports the elbow Oa of an operator O. More specifically, the elbow support 241 includes a support surface 241a that supports the elbow Oa of the operator O. The support surface 241a is a curved surface that is recessed downward (Z2 direction side) from above (Z1 direction side). The elbow Oa of the operator O is placed on the support surface 241a. The elbow guide mechanism 240 may include a fixing member such as a belt to fix the elbow Oa of the operator O to the elbow support 241. The elbow support 241 is provided at a tip end of the arm 242.

The arm 242 supports the elbow support 241 such that the elbow support 241 is movable within a predetermined three-dimensional moving range. Specifically, the arm 242 supports the elbow support 241 such that the elbow support 241 is movable in a horizontal direction (X direction and Y direction) and an upward-downward direction (Z direction). Specifically, the arm 242 includes a horizontal linkage 242a that allows the elbow support 241 to move in the horizontal direction, and an upward-downward mover 242b that is connected to the horizontal linkage 242a and allows the elbow support 241 to move in the upward-downward direction. The elbow support 241 is connected to the upward-downward mover 242b. The upward-downward mover 242b is connected to a tip end of the horizontal linkage 242a.

The horizontal linkage 242a includes three horizontal links 311, 312, and 313, each of which is rotatable in a horizontal plane. Rotation of the horizontal links 311, 312, and 313 allows the elbow support 241 to move in the horizontal direction. Specifically, a first end of the horizontal link 311 is connected to a base 314 via the joint, and a second end of the horizontal link 311 is connected to a first end of the horizontal link 312 via the joint. The horizontal link 311 is rotatable about a rotation axis C11 extending along the upward-downward direction (Z direction) with the first end as the center of rotation. The first end of the horizontal link 312 is connected to the second end of the horizontal link 311 via the joint, and a second end of the horizontal link 312 is connected to a first end of the horizontal link 313 via the joint. The horizontal link 312 is rotatable about a rotation axis C12 extending along the upward-downward direction with the first end as the center of rotation. The first end of the horizontal link 313 is connected to the second end of the horizontal link 312 via the joint, and a second end of the horizontal link 313 is connected to the upward-downward mover 242b. The horizontal link 313 is rotatable about a rotation axis C13 extending along the upward-downward direction with the first end as the center of rotation.

The upward-downward mover 242b is connected to the second end of the horizontal link 313 of the horizontal linkage 242a so as to be movable in the upward-downward direction (Z direction). The upward-downward mover 242b moves in the upward-downward direction such that the elbow support 241 is moved in the upward-downward direction. Specifically, the upward-downward mover 242b is connected to the second end of the horizontal link 313 of the horizontal linkage 242a via a guide rail mechanism (not shown) extending along the upward-downward direction so as to be movable in the upward-downward direction. An urging member 321 (elastic member) that urges the upward-downward mover 242b upward (Z1 direction side) is provided in the upward-downward mover 242b. The urging member 321 is a spring member, for example. The upward-downward mover 242b is movable upward by an upward urging force of the urging member 321. Furthermore, the upward-downward mover 242b is movable downward by resisting the upward urging force of the urging member 321. Thus, when the elbow Oa of the operator O is placed on the elbow support 241, the upward-downward mover 242b moves downward (Z2 direction side) against the upward (Z1 direction side) urging force of the urging member 321 due to the weight of the elbow Oa of the operator O. When the elbow Oa of the operator O placed on the elbow support 241 is moved upward (the Z1 direction side), the upward-downward mover 242b moves upward due to the upward urging force of the urging member 321 so as to follow upward movement of the elbow Oa of the operator O.

In the second embodiment, the elbow support 241 is linearly movable by being supported by the arm 242 including the horizontal linkage 242a and the upward-downward mover 242b. That is, when the master robot 20 is operated by the operator O, the elbow support 241 moves to guide the elbow Oa (the elbow on the side on which the operation unit 21 is held) of the operator O while supporting the elbow Oa of the operator O. Specifically, the elbow support 241 linearly moves while supporting the elbow Oa of the operator O. More specifically, in the second embodiment, the elbow support 241 linearly moves in a direction (X direction) corresponding to the insertion direction of a specimen collection member 101 into a subject S, and directions (Y and Z directions) perpendicular to this direction, for example, while supporting the elbow Oa of the operator O. In the second embodiment, the elbow support 241 linearly moves in a forward-rearward direction (X direction), a right-left direction (Y direction), and the upward-downward direction (Z direction) with respect to the body of the operator O while supporting the elbow Oa of the operator O.

The remaining configurations of the second embodiment are similar to those of the first embodiment.

Advantages of Second Embodiment

According to the second embodiment, the following advantages are achieved.

According to the second embodiment, as described above, the robot system 200 includes the elbow guide mechanism 240 including the elbow support 241 operable to move to guide the elbow Oa of the operator O while supporting the elbow Oa of the operator O when the master robot 20 is operated by the operator O. Accordingly, similarly to the first embodiment, even when a slave robot 10 is operated to perform work (specimen collection) while the elbow Oa of the operator O is supported by the elbow support 241, an accurate linear operation for the slave robot 10 can be operated.

According to the second embodiment, as described above, the elbow guide mechanism 240 is an arm-type elbow guide mechanism movable by the plurality of joints. Accordingly, with the arm-type elbow guide mechanism 240 movable by the plurality of joints, the elbow Oa and the entire forearm of the operator O can be relatively freely moved, and thus the elbow Oa and the entire forearm of the operator O can be easily moved linearly. Consequently, a linear operation for the slave robot 10 can be easily and accurately performed. Furthermore, with the arm-type elbow guide mechanism 240 movable by the plurality of joints, the elbow Oa and the entire forearm of the operator O can be relatively freely moved while the elbow Oa of the operator O is supported by the elbow support 241, and thus the slave robot 10 can be easily operated while the burden on the operator O is reduced.

According to the second embodiment, as described above, the arm-type elbow guide mechanism 240 includes the arm 242 to support the elbow support 241 such that the elbow support 241 is movable in the horizontal direction and the upward-downward direction. Accordingly, the elbow support 241 can be moved in the horizontal direction and the upward-downward direction, and thus the elbow Oa and the entire forearm of the operator O can be more freely moved as compared with a case in which the elbow support 241 is movable only in the horizontal direction. Consequently, the slave robot 10 can be more easily operated while the burden on the operator O is reduced.

According to the second embodiment, as described above, the arm 242 includes the horizontal linkage 242a to allow the elbow support 241 to move in the horizontal direction, and the upward-downward mover 242b connected to the horizontal linkage 242a to allow the elbow support 241 to move in the upward-downward direction. Accordingly, the horizontal linkage 242a allows the elbow support 241 to move in the horizontal direction, and the upward-downward mover 242b allows the elbow support 241 to move in the upward-downward direction. Consequently, the elbow Oa and the entire forearm of the operator O can be more easily moved in the horizontal direction and the upward-downward direction.

According to the second embodiment, as described above, the arm-type elbow guide mechanism 240 is attached to the master robot. Accordingly, it is not necessary to provide, separately from and independently of the master robot 20, a support member to which the arm-type elbow guide mechanism 240 is attached. Consequently, a linear operation for the slave robot 10 can be accurately performed with the arm-type elbow guide mechanism 240 while the number of components is reduced, and the structure is simplified.

The remaining advantages of the second embodiment are similar to those of the first embodiment.

Third Embodiment

The configuration of a robot system 300 according to a third embodiment is now described with reference to FIGS. 9 to 12. In the robot system 300, ureteroscopic surgery is performed, unlike the first and second embodiments in which a specimen is collected. The same or similar configurations as those of the first and second embodiments are denoted by the same reference numerals, and detailed description thereof is omitted.

Figure 9:
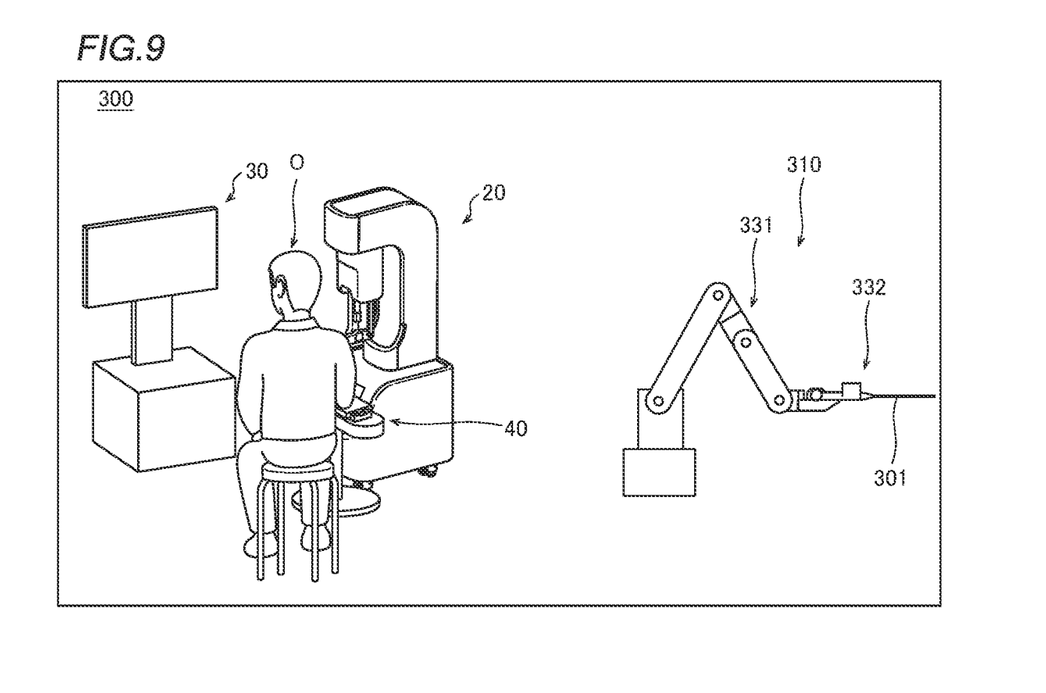
FIG. 9 is a diagram showing a robot system according to a third embodiment.

As shown in FIG. 9, the robot system 300 according to the third embodiment includes a slave robot 310, a master robot 20, a display 30, and an elbow guide mechanism 40.

Figure 10:
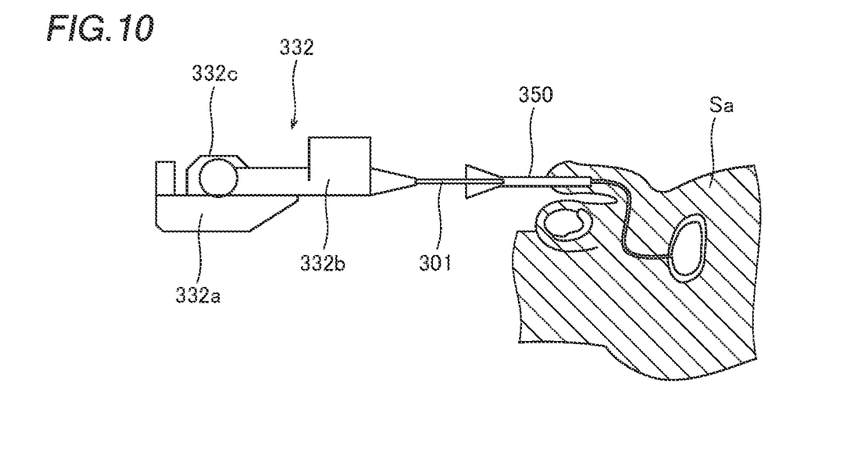
FIG. 10 is a diagram showing ureteroscopic surgery performed by operating a slave robot according to the third embodiment.

As shown in FIGS. 9 and 10, the slave robot 310 performs a procedure to perform ureteroscopic surgery on a person to be treated Sa (patient) to crush a urinary calculus using a treatment member 301. The treatment member 301 is a bendable flexible tube. The slave robot 310 inserts the treatment member 301 into the urethra of the person to be treated Sa through a ureteral access sheath 350 inserted in advance into the urethra of the person to be treated Sa by a medical staff, and images the inside of the urinary tract of the person to be treated Sa, such as the urethra and ureter. The captured video is displayed on the display 30. An operator O operates the slave robot 310 using the master robot 20 to perform ureteroscopic surgery on the person to be treated Sa while checking the real-time video of the person to be treated Sa displayed on the display 30. In the ureteroscopic surgery, a calculus site of the person to be treated Sa is specified, the calculus is crushed by radiating laser light with a pair of laser forceps, and the calculus is retrieved with a pair of basket forceps, for example.

The slave robot 310 is a vertical articulated robot. The slave robot 310 includes an arm 331 and a hand 332 attached to a tip end of the arm 331. The arm 331 has a plurality of joints. Each of the plurality of joints of the arm 331 includes a drive such as a servomotor and a position detector such as an encoder. The hand 332 holds the treatment member 301, which is a bendable flexible tube. The hand 332 includes a hand base 332a, a ureteroscope main body 332b, and a motor 332c. The hand base 332a is attached to a tip end of the arm 331. The ureteroscope main body 332b can image the inside of the urinary tract of the person to be treated Sa. A pair of laser forceps for crushing a urinary calculus of the person to be treated Sa or a pair of basket forceps for retrieving the urinary calculus can be inserted into the ureteroscope main body 332b. The ureteroscope main body 332b holds the treatment member 301. The motor 332c rotates the ureteroscope main body 332b in a A4 direction (see FIG. 11) described below.

Figure 11:
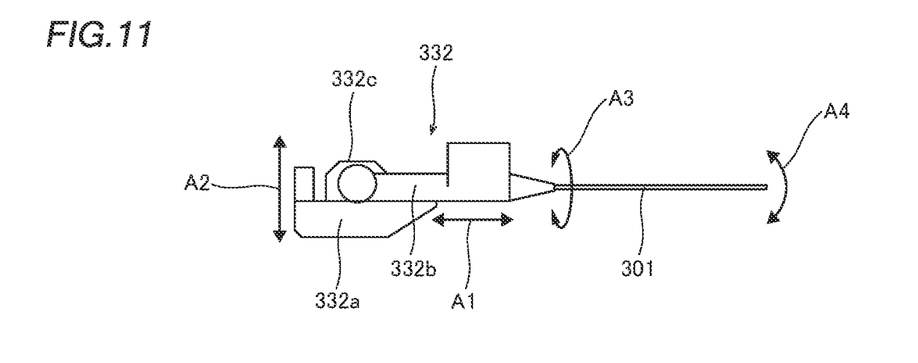
FIG. 11 is a diagram for illustrating the operation of a hand according to the third embodiment.

As shown in FIG. 11, the hand 332 is operated in a plurality of directions. Specifically, the hand 332 is linearly moved in a forward-rearward direction (A1 direction) and in an upward-downward direction (A2 direction), and is rotated in a first rotation direction (A3 direction) about a first rotation axis extending in the forward-rearward direction and in a second rotation direction (A4 direction) about a second rotation axis extending in a right-left direction. The forward-rearward direction, the right-left direction, the upward-downward direction, the first rotation direction, and the second rotation direction are directions with respect to the hand 332. When the treatment member 301 is inserted into the urethra of the person to be treated Sa, the hand 332 is linearly moved forward (insertion direction).

Figure 12:
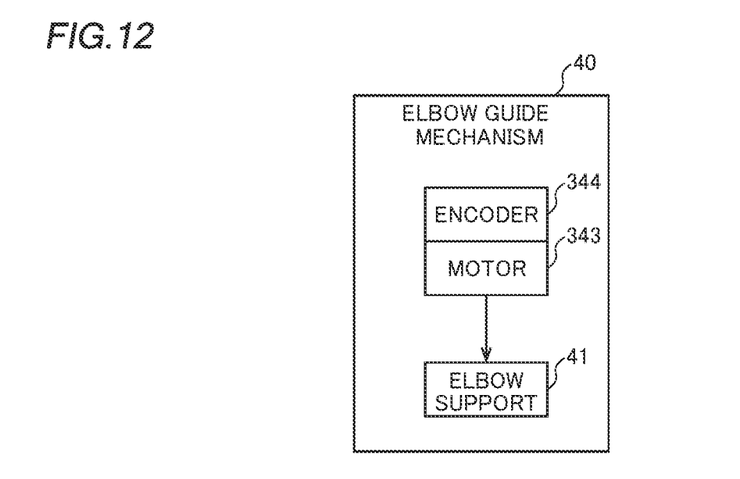
FIG. 12 is a block diagram showing an elbow guide mechanism according to the third embodiment.

In the third embodiment, as shown in FIG. 12, the elbow guide mechanism 40 includes a motor 343 that drives an elbow support 41 and an encoder 344 that detects the position of the elbow support 41 by detecting the rotational position of the motor 343. The master robot 20 remotely controls the slave robot 310 based on the detection result of the encoder 344. The elbow support 41 linearly moves in a direction corresponding to the insertion direction of the treatment member 301 into the person to be treated Sa while supporting the elbow Oa of the operator O. The master robot 20 remotely controls the slave robot 310 based on the detection result of linear movement of the elbow support 41 by the encoder 344. Specifically, the master robot 20 remotely controls the slave robot 310 such that the hand 332 moves in the A1 direction based on the detection result of linear movement of the elbow support 41 by the encoder 344. In the third embodiment, the elbow guide mechanism 40 functions together with an operation unit 21 of the master robot 20 as an operation unit that remotely controls the hand 332 of the slave robot 310.

Although an example in which the robot system 300 includes the elbow guide mechanism 40 according to the first embodiment has been described, the robot system 300 may include the elbow guide mechanism 240 according to the second embodiment. When the robot system 300 includes the elbow guide mechanism 240, each joint of the arm 242 of the elbow guide mechanism 240 may include a motor that drives the elbow support 241 and an encoder that detects the position of the elbow support 241 by detecting the rotational position of the motor, and the master robot 20 may remotely control the slave robot 310 based on the detection result of the encoder.

The remaining configurations of the third embodiment are similar to those of the first or second embodiment.

Advantages of Third Embodiment

According to the third embodiment, the following advantages are achieved.

According to the third embodiment, as described above, the robot system 300 includes the elbow guide mechanism 40 including the elbow support 41 operable to move to guide the elbow Oa of the operator O while supporting the elbow Oa of the operator O when the master robot 20 is operated by the operator O. Accordingly, similarly to the first embodiment, even when the slave robot 310 is operated to perform work (ureteroscopic surgery) while the elbow Oa of the operator O is supported by the elbow support 41, an accurate linear operation for the slave robot 310 can be performed.

According to the third embodiment, as described above, the elbow guide mechanism 40 includes the encoder 344 to detect the position of the elbow support 41, and the master robot 20 is operable to remotely control the slave robot 310 based on the detection result of the encoder 344. Accordingly, the elbow guide mechanism 40 can function not only as a guide but also as an operation actuator, and thus the slave robot 310 can be easily remotely controlled.

According to the third embodiment, as described above, the elbow support 41 is operable to linearly move in at least the direction corresponding to the insertion direction of the treatment member 301 into the person to be treated Sa while supporting the elbow of the operator O, and the master robot 20 is operable to remotely control the slave robot 310 based on the detection result of linear movement of the elbow support 41 by the encoder 344. Accordingly, when the slave robot 310 is operated to insert the treatment member 301 into the person to be treated Sa, an accurate linear operation for the slave robot 310 can be easily performed.

The remaining advantages of the third embodiment are similar to those of the first or second embodiment.

Modified Examples

The embodiments disclosed this time must be considered as illustrative in all points and not restrictive. The scope of the present disclosure is not shown by the above description of the embodiments but by the scope of claims for patent, and all modifications (modified examples) within the meaning and scope equivalent to the scope of claims for patent are further included.

For example, while the example in which the slave robot is a vertical articulated robot has been shown in each of the aforementioned first to third embodiments, the present disclosure is not limited to this. For example, the slave robot may be a robot other than a vertical articulated robot, such as a horizontal articulated robot or a dual-arm robot.

While the example in which the linearly moving type elbow support linearly moves in the direction (forward-rearward direction) corresponding to the insertion direction of the specimen collection member into the subject has been shown in each of the aforementioned first and third embodiments, the present disclosure is not limited to this. For example, the linearly moving type elbow support may linearly move in a direction other than the forward-rearward direction, such as the right-left direction.

While the example in which the linearly moving type elbow support is arranged on the stand provided separately from and independent of the master robot has been shown in each of the aforementioned first and third embodiments, the present disclosure is not limited to this. For example, a stand may be provided on the master robot, and the linearly moving type elbow support may be arranged on the stand provided on the master robot.

While the example in which the orientation of the linearly moving type elbow support is adjustable on the stand has been shown in each of the aforementioned first and third embodiments, the present disclosure is not limited to this. For example, the linearly moving type elbow support may be fixed on the stand.

While the example in which the arm-type elbow guide mechanism has three joints has been shown in the aforementioned second embodiment, the present disclosure is not limited to this. For example, the arm-type elbow guide mechanism may have two or four or more joints.

While the example in which the arm includes the horizontal linkage and the upward-downward mover has been shown in the aforementioned second embodiment, the present disclosure is not limited to this. For example, the arm may include only the horizontal linkage. That is, the arm may support the elbow support such that the elbow support is movable only in the horizontal direction.

While the example in which the arm includes the horizontal linkage has been shown in the aforementioned second embodiment, the present disclosure is not limited to this. For example, the arm may include a linkage including one or more links rotatable in a horizontal plane and one or more links rotatable in a vertical plane.

While the example in which the arm-type elbow guide mechanism is attached to the master robot has been shown in the aforementioned second embodiment, the present disclosure is not limited to this. For example, the arm-type elbow guide mechanism may be attached to a support member provided separately from and independently of the master robot.

While the example in which the robot system is a robot system that collects a specimen from a subject using the specimen collection member (inspection instrument) has been shown in each of the aforementioned first and second embodiments, the present disclosure is not limited to this. For example, the robot system may be a robot system that examines a subject (patient) using a diagnostic inspection instrument (treatment member).

While the example in which the encoder is used as the position detector that detects the position of the elbow support of the elbow guide mechanism has been shown in the aforementioned third embodiment, the present disclosure is not limited to this. For example, a position detector other than the encoder may be used as the position detector that detects the position of the elbow support of the elbow guide mechanism. When a position detector other than the encoder is used as the position detector, the elbow guide mechanism may not include the motor.

While the example in which a procedure is performed to collect a specimen from a person to be treated has been shown in each of the aforementioned first and second embodiments, and the example in which a procedure is performed to perform ureteroscopic surgery on a person to be treated has been shown in the aforementioned third embodiment, the present disclosure is not limited to this. For example, a procedure other than a procedure to collect a specimen from a person to be treated and a procedure to perform ureteroscopic surgery on a person to be treated may be performed. The term "procedure" indicates a broader concept including collecting a specimen from a person to be treated, performing an examination on a person to be treated, performing surgery on a person to be treated, etc.

DESCRIPTION OF REFERENCE NUMERALS 10, 310: slave robot
20: master robot
40, 240: elbow guide mechanism
41, 241: elbow support
42: stand
100, 200, 300: robot system
101: specimen collection member (treatment member)
242: arm
242$a$: horizontal linkage
242$b$: upward-downward mover
301: treatment member
411: rail
411$b$: stopper
412: slider
O: operator
S: subject (person to be treated)
Sa: person to be treated

The invention claimed is:

1. A robot system comprising:
a slave robot;
a master robot to remotely control the slave robot; and
an elbow guide mechanism configured to include an elbow support operable to move to guide an elbow of an operator while supporting the elbow of the operator when the master robot is operated by the operator, wherein
the elbow support of the elbow guide mechanism is configured to be slidable and to be of a linearly moving type, and
the linearly moving type elbow support includes a rail extending along a predetermined direction, and a slider operable to slide on the rail along the predetermined direction and support the elbow of the operator.

2. The robot system according to claim 1, wherein the elbow support is operable to linearly move while supporting the elbow of the operator.

3. The robot system according to claim 1, wherein the elbow support is operable to linearly move in at least a direction corresponding to an insertion direction of a treatment member into a person to be treated while supporting the elbow of the operator.

4. The robot system according to claim 1, wherein the elbow support is operable to linearly move in at least a forward-rearward direction with respect to a body of the operator while supporting the elbow of the operator.

5. The robot system according to claim 1, wherein the slider is operable to slide within a sliding range restricted by stoppers.

6. The robot system according to claim 1, wherein
the elbow guide mechanism further includes a stand to support the linearly moving type elbow support; and
an orientation of the elbow support is adjustable on the stand.

7. The robot system according to claim 1, wherein the elbow guide mechanism is an arm-type elbow guide mechanism configured to be movable by a plurality of joints.

8. The robot system according to claim 7, wherein the arm-type elbow guide mechanism includes an arm to support the elbow support such that the elbow support is movable in a horizontal direction and an upward-downward direction.

9. The robot system according to claim 7, wherein the arm-type elbow guide mechanism is configured to be attached to the master robot.

10. A robot system comprising:
a slave robot;
a master robot to remotely control the slave robot; and
an elbow guide mechanism configured to include an elbow support operable to move to guide an elbow of an operator while supporting the elbow of the operator when the master robot is operated by the operator, wherein
the elbow guide mechanism is an arm-type elbow guide mechanism configured to be movable by a plurality of joints,
the arm-type elbow guide mechanism configured to include an arm to support the elbow support such that the elbow support is movable in a horizontal direction and an upward-downward direction, and
the arm includes a horizontal linkage to allow the elbow support to move in the horizontal direction, and an upward-downward mover connected to the horizontal linkage to allow the elbow support to move in the upward-downward direction.

11. A robot system comprising:
a slave robot;
a master robot to remotely control the slave robot; and
an elbow guide mechanism configured to include an elbow support operable to move to guide an elbow of an operator while supporting the elbow of the operator when the master robot is operated by the operator, wherein
the elbow guide mechanism is configured to include a position detector to detect a position of the elbow support,
the master robot is operable to remotely control the slave robot based on a detection result of the position detector, the elbow support is operable to linearly move in at least a direction corresponding to an insertion direction of a treatment member into a person to be treated while supporting the elbow of the operator; and the master robot is operable to remotely control the slave robot based on a detection result of linear movement of the elbow support by the position detector.

* * * * *